DAVID G. MOSHER.
Improvement in Insect Destroyers.
No. 119,389.                  Patented Sep. 26, 1871.
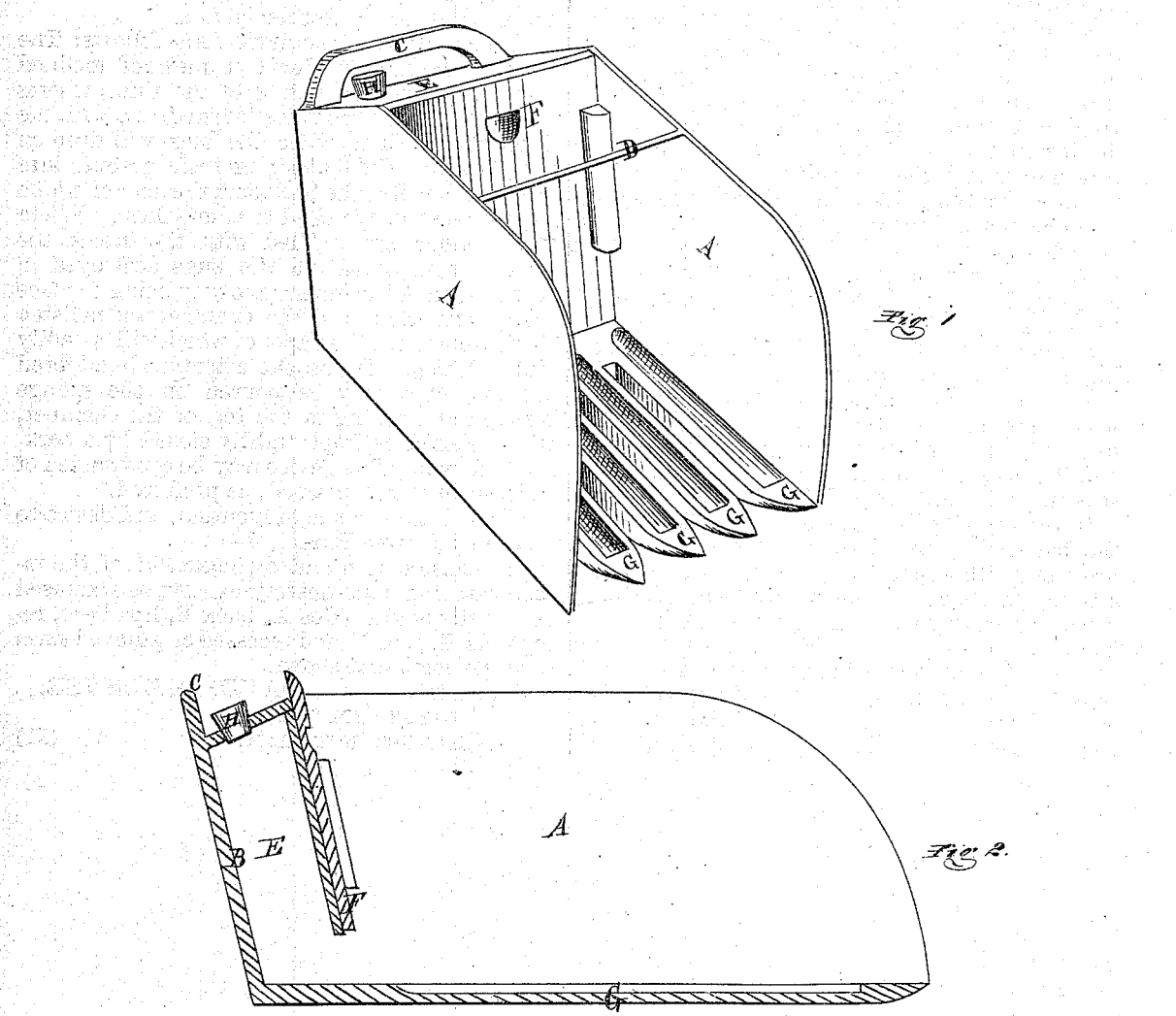

UNITED STATES PATENT OFFICE.

DAVID G. MOSHER, OF MOSHERVILLE, MICHIGAN.

IMPROVEMENT IN INSECT-DESTROYERS.

Specification forming part of Letters Patent No. 119,389, dated September 26, 1871.

*To all whom it may concern:*

Be it known that I, DAVID G. MOSHER, of Mosherville, in the county of Hillsdale and State of Michigan, have invented a new and useful Improvement in a Device for Catching and Destroying Potato-Bugs and other Insects; and I do declare that the following is a true and accurate description thereof, reference being had to the accompanying drawing and to the letters of reference marked thereon, and being a part of this specification, in which—

Figure 1 is a perspective view of my device, and Fig. 2 is a vertical longitudinal section of the same.

Similar letters of reference indicate corresponding parts in the several figures.

This invention relates to a device by means of which potato-bugs and other insects may be caught from the vines or plants and destroyed; and it consists in the peculiar construction of the several parts, as more fully hereinafter set forth.

In the drawing, A represents the sides, and B the back of a scoop-like box, the latter being provided with a handle, C, and the former with a transverse bar, D, at the top, by means of which it may be grasped and held with one or both hands by the operator. E is a receptacle or chamber formed across the back end of the device, provided with an upward-sliding door, F, on the front side. The bottom of the device in front of the chamber is composed of a series of semi-cylindrical pointed tines, G, grooved on their upper sides nearly to their pivots.

The operation of the device is as follows: The operator, holding the device in one hand inclined upward toward the points of the tines, inserts the latter among the vines infested, and with the other shakes them, when the bugs will drop on the tines and slide along in their grooves into the chamber E at the back end, the door of which should be slightly raised to admit them. When the chamber is well filled with the insects the door may be closed and the bugs destroyed in any convenient manner; one way being to place a sponge in the top of the chamber and moisten it with ammonia, the vapor of which will speedily suffocate them. In case the latter plan be adopted the ammonia may be poured on the sponge through an opening in the top of the chamber, which should be kept tightly closed by a cork, H, as shown. The device may be constructed of light sheet metal or wood, as preferred.

What I claim as my invention, and desire to secure by Letters Patent, is—

The construction and arrangement of the insect-catching-and-destroying device, composed essentially of the sides A, back B, handle C, receptacle E, door F, and recessed or grooved tines G, as set forth and shown.

DAVID G. MOSHER.

Witnesses:
THOMAS CAMPBELL,
CHARLES INGRAHAM.

(51)